(12) United States Patent
Schlipf et al.

(10) Patent No.: US 11,897,613 B2
(45) Date of Patent: Feb. 13, 2024

(54) WING FOR AN AIRCRAFT

(71) Applicant: Airbus Operations GmbH, Hamburg (DE)

(72) Inventors: Bernhard Schlipf, Hamburg (DE); Florian Lorenz, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 17/834,341

(22) Filed: Jun. 7, 2022

(65) Prior Publication Data

US 2022/0388629 A1 Dec. 8, 2022

(30) Foreign Application Priority Data

Jun. 8, 2021 (DE) .......................... 102021114747.6

(51) Int. Cl.
*B64C 9/24* (2006.01)
*B64C 9/02* (2006.01)
*B64C 13/28* (2006.01)

(52) U.S. Cl.
CPC ............... *B64C 9/24* (2013.01); *B64C 9/02* (2013.01); *B64C 13/28* (2013.01)

(58) Field of Classification Search
CPC .... B64C 9/22; B64C 9/24; B64C 9/26; B64C 9/02
See application file for complete search history.

(56) References Cited

U.S. PATENT DOCUMENTS

| | | | |
|---|---|---|---|
| 4,399,970 A * | 8/1983 | Evans | B64C 9/24 244/99.3 |
| 8,387,924 B2 | 3/2013 | Gyuricsko et al. | |
| 11,286,033 B2 | 3/2022 | Lorenz et al. | |
| 2020/0023937 A1 | 1/2020 | Everaert et al. | |

(Continued)

FOREIGN PATENT DOCUMENTS

| | | |
|---|---|---|
| EP | 2067696 A2 | 6/2009 |
| EP | 3106386 A1 | 12/2016 |
| EP | 3501977 A1 | 6/2019 |

(Continued)

OTHER PUBLICATIONS

German Search Report; priority document, dated Feb. 3, 2022.
European Search Report from corresponding European application No. 22177913.5-1004, dated Nov. 3, 2022.

*Primary Examiner* — Philip J Bonzell
*Assistant Examiner* — Eric Acosta
(74) *Attorney, Agent, or Firm* — Greer, Burns & Crain, Ltd.

(57) ABSTRACT

A wing for an aircraft, comprising a main wing and a slat assembly with a slat and a connection assembly with a slat track. The front end of the slat track is mounted to the slat, and the rear end and/or the intermediate portion of the slat track are mounted to the main wing by a roller or slide bearing. The slat track is movable along the track longitudinal axis. The connection assembly includes a drive unit. The drive unit includes a rotary actuator mounted to the main wing and having at least one drive arm rotatably driven about a rotation axis and drivingly engaging the slat track, and one of the drive arm and the slat track has at least one groove and the other one of the drive arm and the slat track comprises at least one spigot drivingly engaging the groove.

20 Claims, 10 Drawing Sheets

(56) References Cited

U.S. PATENT DOCUMENTS

2020/0377195 A1    12/2020   Dovey et al.

FOREIGN PATENT DOCUMENTS

| EP | 3718881 A1 | 10/2020 | | |
|----|---|---|---|---|
| WO | 2010026410 A2 | 3/2010 | | |
| WO | 2014100411 A1 | 6/2014 | | |
| WO | 2018197649 A1 | 11/2018 | | |
| WO | WO-2018197649 A1 * | 11/2018 | ............. | B64C 13/28 |
| WO | 2019154698 A1 | 8/2019 | | |
| WO | 2021009060 A1 | 1/2021 | | |

* cited by examiner ial extension and might e.g., be kinked or slightly curved in order to optimize the force engagement direction over the predetermined path of the slat track. Preferably, the drive arm comprises the groove and the slat track comprises the spigot. This relates to a very simple, robust, and cost-efficient drive unit, since no high precision gear teeth are involved and assembly tolerances are rather low compared to a rack-and-pinion drive. Also, maintenance efforts can be essentially reduced. Further, different positions of the drive arm are possible and a dual load path design with two drive arms is enabled.

WING FOR AN AIRCRAFT

CROSS-REFERENCES TO RELATED APPLICATIONS

This application claims the benefit of the German patent application No. 10 2021 114 747.6 filed on Jun. 8, 2021, the entire disclosure of which is incorporated herein by way of reference.

FIELD OF THE INVENTION

The present invention relates to a wing for an aircraft, comprising a main wing and a slat assembly. Further aspects of the invention relate to a slat assembly for such a wing, as well as to an aircraft comprising such a wing and/or comprising such a slat assembly.

BACKGROUND OF THE INVENTION

The slat assembly comprises a slat and at least one connection assembly movably connecting the slat to the main wing, such that the slat can be moved relative to the main wing between a retracted position and at least one extended position.

The connection assembly comprises an elongate slat track that might be curved or straight and that extends along a track longitudinal axis between a front end and a rear end and has an intermediate portion between the front and rear ends. The front end of the slat track is preferably fixedly mounted to the slat, e.g., by two spherical bearings, both arranged with an offset in a wing profile plane across a wing span direction. The rear end and/or the intermediate portion of the slat track are movably mounted to or supported at the main wing by a roller or slide bearing such that the slat track is movable along the track longitudinal axis, i.e., along a predefined path, preferably a circular path. The roller or slide bearing can include rollers and/or slide surfaces.

Further, the connection assembly comprises a drive unit mounted to the main wing and configured for driving the slat track for movement along the track longitudinal axis and along the predetermined path to move the slat between the retracted and extended positions.

Similar wings are known in the art. Some known wings employ a rack-and-pinion drive for driving the slat, wherein a drive pinion engages a rack provided at the slat track. Such rack-and-pinion drives are considerably complex and expensive.

SUMMARY OF THE INVENTION

The object of the present invention is to provide a wing employing a simple, robust, and cost-efficient drive unit.

This object is achieved in that the drive unit comprises a rotary actuator mounted to the main wing, preferably fixedly and directly mounted to the main wing, and having at least one preferably elongate drive arm, preferably in the form of a crank arm, rotatably driven about a rotation axis that is preferably fixed at the main wing, and drivingly engaging the slat track. The drive arm is rotatingly driven preferably by a geared rotary actuator (GRA). One of the drive arm and the slat track comprises at least one groove, such as a slot, preferably extending radially with respect to the rotation axis, and the other one of the drive arm and the slat track comprises at least one spigot, such as a pin, drivingly engaging the groove and preferably extending in parallel to the rotation axis. The groove might also differ from a straight According to a preferred embodiment, the spigot or the groove is provided at a lateral side of the slat track preferably at the intermediate portion of slat track. Preferably, the groove is formed in the drive arm and the spigot extends from the lateral surface of slat track. This relates to a very simple and robust design.

According to a further preferred embodiment, the slat track, when moved along the track longitudinal axis between retracted and extended positions of the slat, is movable along a straight path, preferably in case of a straight slat track, or is movable along a curved path, preferably in case of a curved slat track, having an axis of rotation, i.e., a center of rotation about which the slat track is moved, spaced from the rotation axis of the drive arm, preferably spaced in parallel from the rotation axis. The axes of rotation of the drive arm and the slat track are not coaxial and, thus, the groove is employed. This allows essential freedom of design to optimize the drive unit.

According to a further preferred embodiment, the spigot engages the groove with a predefined play, in particular in a radial direction with respect to the rotation axis. This play enabled the axes of rotation of the drive arm and the slat track to not be coaxial and allows for the optimization of the drive unit.

In particular, it is preferred that the groove is formed as a slot, in particular a long hole, preferably extending in a radial direction with respect to the rotation axis, so that the spigot can move radially within the slot when the drive arm is rotated to move the slat track. The slot therefore provides a radial play for the spigot that is required when the axes of rotation of the drive arm and the slat track are not coaxial.

According to a preferred embodiment, the groove is open at an outer end, i.e., a distal end, of the drive arm. In such a way, the spigot can be more easily inserted into the groove, which largely simplifies assembly of the slat assembly.

According to a preferred embodiment, the one of the drive arm and the slat track comprising the at least one groove comprises two grooves, and the other one of the drive arm and the slat track comprising the at least one spigot comprises two spigots drivingly engaging the two grooves. Preferably, the drive arm comprises two grooves and the slat track comprises two spigots drivingly engaging the two grooves. Employing two grooves and two spigots enables a more efficient load transfer from the drive arm to the slat track for a longer path of the movement of the slat track.

According to a preferred embodiment, the drive arm is a first drive arm and the rotary actuator comprises a second drive arm, preferably in the form of a crank arm, rotatably driven about the rotation axis and drivingly engaging the slat track. By such a second drive arm, a second load path can be realized to achieve redundant load paths.

In particular, it is preferred that one of the first drive arm and the slat track comprises a first groove, in particular a slot or a long hole, preferably extending in a radial direction with respect to the rotation axis, and the other one of the first drive arm and the slat track comprises a first spigot, such as a pin, drivingly engaging the first groove and preferably extending in parallel to the rotation axis. Additionally or alternatively, one of the second drive arm and the slat track comprises a second groove, in particular a slot or a long hole, preferably extending in a radial direction with respect to the rotation axis, and the other one of the second drive arm and the slat track comprises a second spigot, such as a pin, drivingly engaging the second groove and preferably extending in parallel to the rotation axis. This provides a simple and robust redundant load path design.

It is further preferred that the first spigot and the second spigot are formed integrally and/or extend coaxially to one another. This provides a simple and robust redundant load path design.

Alternatively, it is preferred that the first spigot is spaced apart, preferably parallelly spaced apart, from the second spigot along the track longitudinal axis. In such a way, the first and second spigots are staggered along the track longitudinal axis, so that a redundant load path design is formed with increased load transfer efficiency for a longer path of movement of the slat track.

According to a preferred embodiment, the roller or slide bearing comprises a guide rail fixedly mounted to the main wing and a first roller unit mounted to the rear end of the slat track and engaging the guide rail. Preferably, the guide rail is formed, e.g., by a c-shape, such that its surfaces lie opposite the circumferential surface of the first roller unit, wherein the distance between an upper surface and a lower surface of the guide rail is larger than a diameter of the first roller unit, so that the first roller unit may engage only either the upper surface or the lower surface of the guide rail at the same time. That is the distance between upper and lower surfaces of the guide rail is selected such that a clearance is provided between the first roller unit and either the upper surface or the lower surface of the guide rail, so that the first roller unit cannot engage with the upper and lower surfaces of the guide rail at the same time and thereby block the first roller unit. Further preferably, the first roller unit has a first axis of rotation extending in parallel to a wing span direction, to a leading edge of main wing, or to a leading edge of the slat.

In particular, it is preferred that the roller or slide bearing comprises a second roller unit that is fixedly mounted to the main wing and that engages an engagement surface provided at the intermediate portion of the slat track. Preferably, the second roller unit has a second axis of rotation extending in parallel to the wing span direction, to the leading edge of the main wing, or to the leading edge of the slat.

It is further preferred that the slat track has a profile, i.e., a cross section across the longitudinal axis, comprising an upper flange portion, a lower flange portion and at least one web portion connecting upper and lower flange portions. Such a profile might be, e.g., a C-profile, a double-C-profile, an I-profile, an H-profile, or a Π-profile. The second roller unit is arranged in a recess between upper and lower flange portions and engages the engagement surface provided at the upper flange portion and/or at the lower flange portion, preferably either the upper flange portion or the lower flange portion or both flange portions in a successive manner. In such a way, the second roller unit does not occupy the space above and below the slat track, and the slat track can be held with only a single roller element. This simplifies the connection assembly, saves space and weight, and thus increases efficiency of the wing. Further, the connection assembly can be formed such that it is arranged entirely in front of the front spar of the associated wing and does not penetrate the front spar.

According to a preferred embodiment, the slat track has such a profile, in particular an I-profile or double-C-profile, that a first recess is formed between the upper and lower flange portions at a first side of the web portion, and a second recess is formed between the upper and lower flange portions at a second side of the web portion opposite the first side. In such a way, two roller elements can be received in both recesses.

In particular, it is preferred that the second roller unit comprises a first roller element and a second roller element. The first roller element is arranged in the first recess and the second roller element is arranged in the second recess. First and second roller elements are arranged coaxially, i.e., both rotating about the second axis of rotation, and have the same radius. By the first and second roller element higher loads can be absorbed and a symmetric arrangement or an arrangement with two separate load paths is enabled.

In particular, it is preferred that the groove or the spigot is arranged in the web portion. Preferably, the spigot is received in a corresponding bore in the web portion and projects away from the web portion from one side or from both opposite sides. This provides a particularly simple and robust design.

According to a preferred embodiment, the slat track comprises a first track part and a second track part that are formed separate from one another. Each of the first and second track parts is formed integrally and extends along the track longitudinal axis from the rear end to the front end. The first and second track parts are mounted to one another, e.g., by bolts, and rest against one another along a contact plane spanned by the track longitudinal axis and a wing thickness direction, which might be a vertical symmetry plane, preferably along the entire longitudinal extension. Preferably, the first and second track parts each have a C-shaped profile which are preferably arranged back-to-back, so that both track parts together have a double-C-shaped profile. By the first and second track part, two separate load paths are introduced which might be designed as redundant load paths such that when one load path fails the other load path is still capable of carrying the occurring air loads applied via the slat.

In particular, it is preferred that the cross-section across the track longitudinal axis of the slat track is formed such that a predefined gap is formed between a portion of the first track part, preferably a lower portion of the first track part, and a portion of the second track part, preferably a lower portion of the second track part, in extension of the contact plane. The spigot or the groove is arranged in the web portion of the first and second track parts on opposite sides of the gap. The drive arm extends inside the gap to engage with the slat track, preferably to engage the spigot or the groove arranged in the web portion by the respective other of the spigot and the groove arranged in the drive arm. This relates to a particularly compact and robust design with redundant load paths.

According to a preferred embodiment, the connection assembly is a first connection assembly. The wing comprises a second connection assembly connecting the slat to the main wing in a position spaced apart from the first connection assembly in a wing span direction. The second connection assembly is formed as the first connection assembly, i.e., has the same features as the first connection assembly. Alternatively, the second connections assembly might also be formed different from the first connection assembly.

A further aspect of the invention relates to a slat assembly for the wing according to any of the above-described embodiments. The slat assembly comprises a slat, and at least one connection assembly for movably connecting the slat to a main wing for an aircraft. The connection assembly comprises an elongate slat track that extends along a track longitudinal axis between a front end and a rear end and has an intermediate portion between the front and rear ends. The front end of the slat track is configured to be mounted to the slat. The rear end and/or the intermediate portion of the slat track are configured to be mounted to the main wing by a roller or slide bearing such that the slat track is movable along the track longitudinal axis. The connection assembly comprises a drive unit configured to be mounted to the main wing and configured for driving the slat track for movement along the track longitudinal axis along a predefined path between retracted and extended positions of the slat. The drive unit comprises a rotary actuator mounted to the main wing and having at least one drive arm rotatably driven about a rotation axis and drivingly engaging the slat track. One of the drive arm and the slat track comprises at least one groove and the other one of the drive arm and the slat track comprises at least one spigot drivingly engaging the groove. The features and effects described above in connection with the wing apply vis-à-vis also in case of the slat assembly.

A further aspect of the invention relates to an aircraft comprising a wing according to any of the above-described embodiments and/or comprising a slat assembly according to any of the above-described embodiments. The features and effects described above in connection with the wing or the slat assembly apply vis-à-vis also in case of the aircraft.

BRIEF DESCRIPTION OF THE DRAWINGS

Hereinafter, preferred embodiments of the present invention are explained in more detail by means of a drawing.

DETAILED DESCRIPTION OF THE PREFERRED EMBODIMENTS

Figure 1:
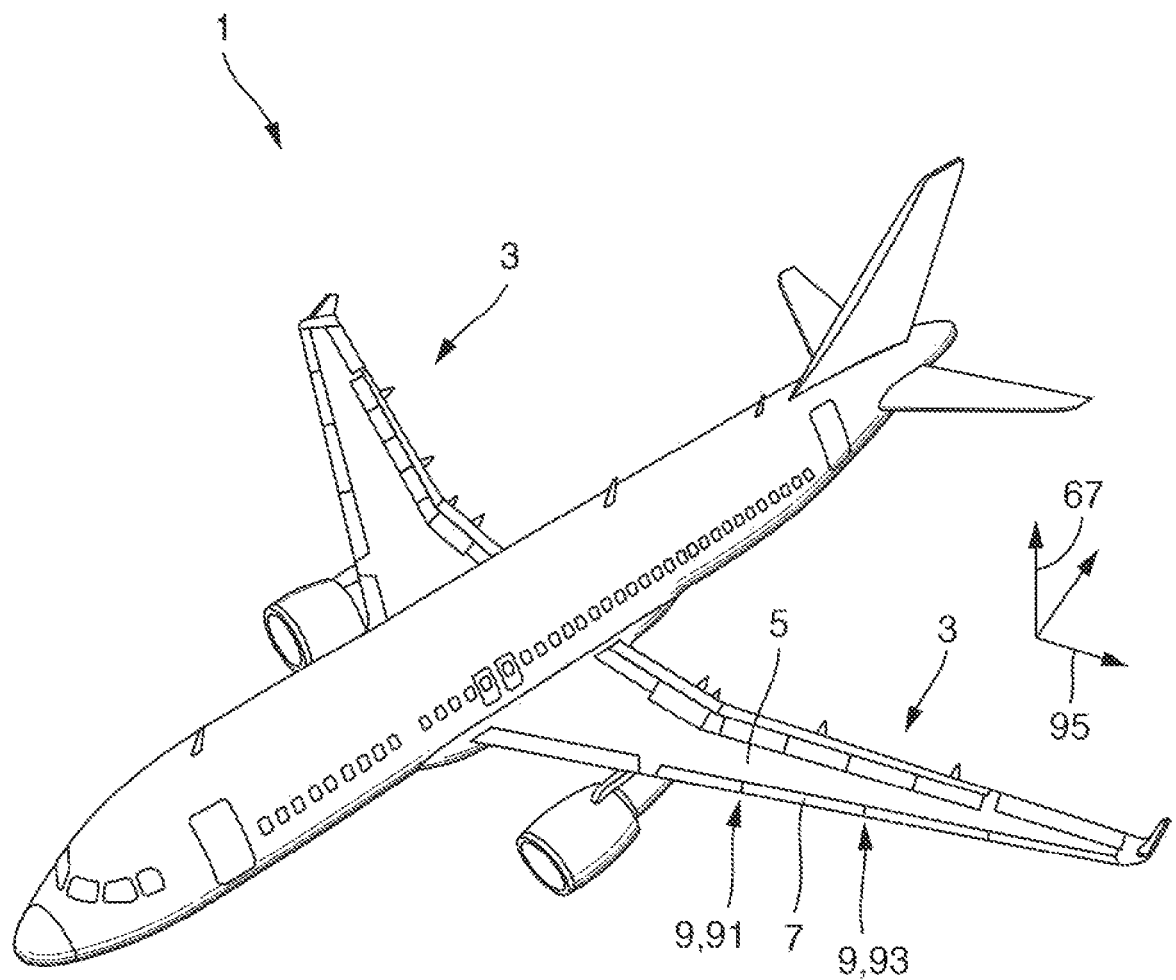
FIG. 1 shows a perspective view of an aircraft according to the present invention, including a wing.

In FIG. 1 an aircraft 1 according to an embodiment of the present invention is illustrated. The aircraft 1 comprises a wing 3 that is formed according to an embodiment of the present invention. The 3 wing comprises a main wing 5 and a slat assembly 6.

Figure 2:
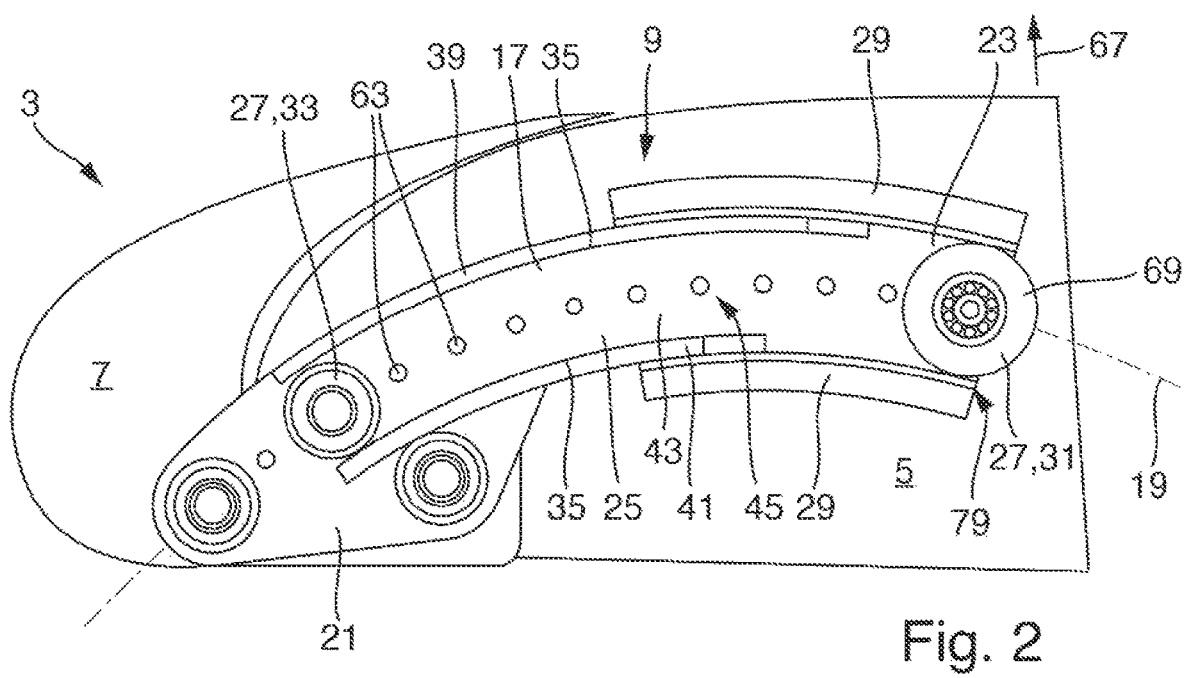
FIG. 2 shows a cross sectional view of the wing shown in FIG. 1, including a connection assembly.

FIG. 2 shows the wing 1 from FIG. 1 in more detail. The wing 1 comprises the main wing 5 and the slat assembly 6, the slat assembly 6 comprising a slat 7 and a connection assembly 9 movably connecting the slat 7 to the main wing 5, such that the slat 7 is movable between a retracted position and at least one extended position.

Figure 3:
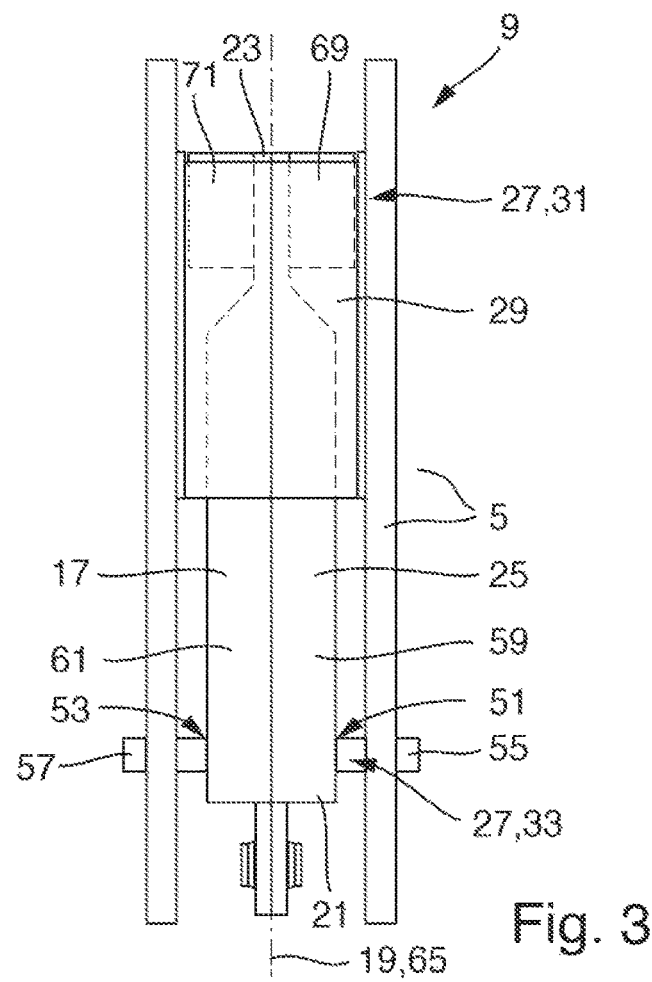
FIG. 3 shows a top view of the connection assembly shown in FIG. 2.
Figure 4:
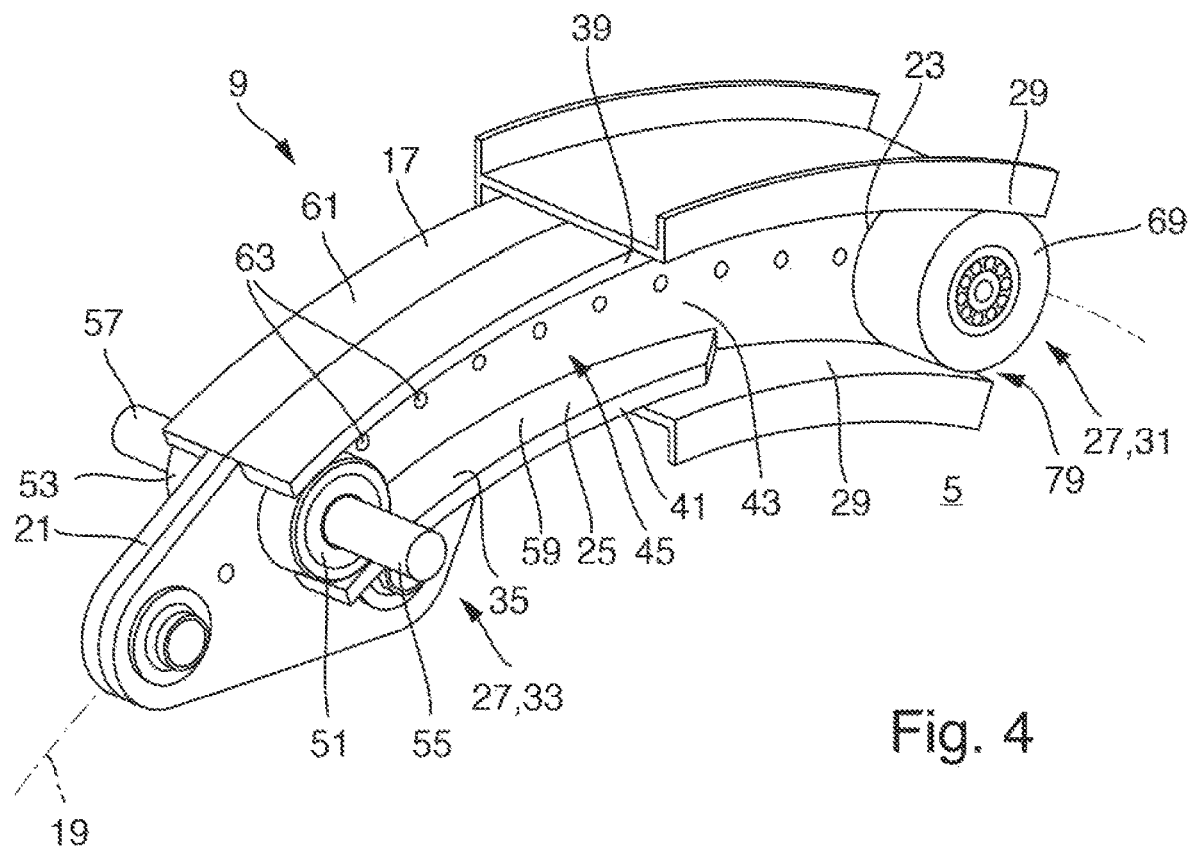
FIG. 4 shows a perspective view of the connection assembly shown in FIG. 2.
Figure 5:
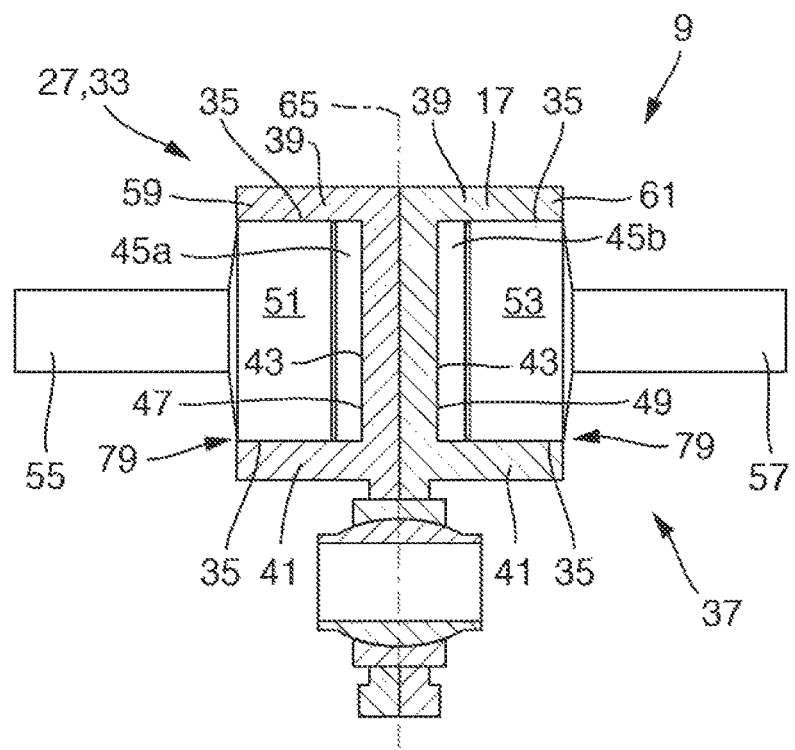
FIG. 5 shows a cross sectional view across the track longitudinal axis of the connection assembly shown in FIG. 2.

The connection assembly 9 comprises an elongate slat track 17 that extends along a track longitudinal axis 19 between a front end 21 and a rear end 23 and has an intermediate portion 25 between the front and rear ends 21, 23. The front end 21 of the slat track 17 is fixedly mounted to the slat 7. The rear end 23 and the intermediate portion 25 of the slat track 17 are movably mounted to the main wing 5 by a roller or slide bearing 27 such that the slat track 17 is movable along the track longitudinal axis 19. The roller or slide bearing 27 comprises a guide rail 29 fixedly mounted to the main wing 5 and a first roller unit 31 fixedly mounted to the rear end 23 of the slat track 17 and engaging the guide rail 29. The roller or slide bearing 27 comprises a second roller unit 33 that is fixedly mounted to the main wing 5 and that engages an engagement surface 35 provided at the intermediate portion 25 of the slat track 17. As shown in FIGS. 3-5, the slat track 17 has a double-C-shaped profile 37 comprising an upper flange portion 39, a lower flange portion 41 and at least one web portion 43 connecting upper and lower flange portions 39, 41. The second roller unit 33 is arranged in a recess 45 between upper and lower flange portions 39, 41 and engages the engagement surface 35 provided at the upper flange portion 39 and at the lower flange portion 41.

As shown in FIGS. 4 and 5, the double-C-shaped profile 37 of the slat track 17 provides that a first recess 45a is formed between the upper and lower flange portions 39, 41 at a first side 47 of the web portion 43, and a second recess 45b is formed between the upper and lower flange portions 39, 41 at a second side 49 of the web portion 43 opposite the first side 47. The second roller unit 33 comprises a first roller element 51 and a second roller element 53. The first roller element 51 is arranged in the first recess 45a and the second roller element 53 is arranged in the second recess 45b. First and second roller elements 51, 53 are arranged coaxially and have the same radius. The first roller element 51 is mounted on a first shaft 55 and the second roller element 53 is mounted on a second shaft 57 separate from the first shaft 55. First and second shafts 55, 57 are independently supported at the main wing 5.

FIGS. 3-5 show that the slat track 17 comprises a first track part 59 and a second track part 61 that are formed separate from one another. Each of the first and second track parts 59, 61 is formed integrally and extends along the track longitudinal axis 19 from the rear end 23 to the front end 21. The first and second track parts 59, 61 are mounted to one another by bolts 63 and rest against one another along a contact plane 65 spanned by the track longitudinal axis 19 and a wing thickness direction 67. As visible in FIG. 3, the first roller unit 31 comprises a third roller element 69 and a fourth roller element 71. Third and fourth roller elements 69, 71 are arranged coaxially and have the same radius. The third roller element 69 is mounted to the first track part 59 and the fourth roller element 71 is mounted to the second track part 61. Alternatively, the first roller unit 31 might also comprise only a single third roller element 69.

Figure 6:
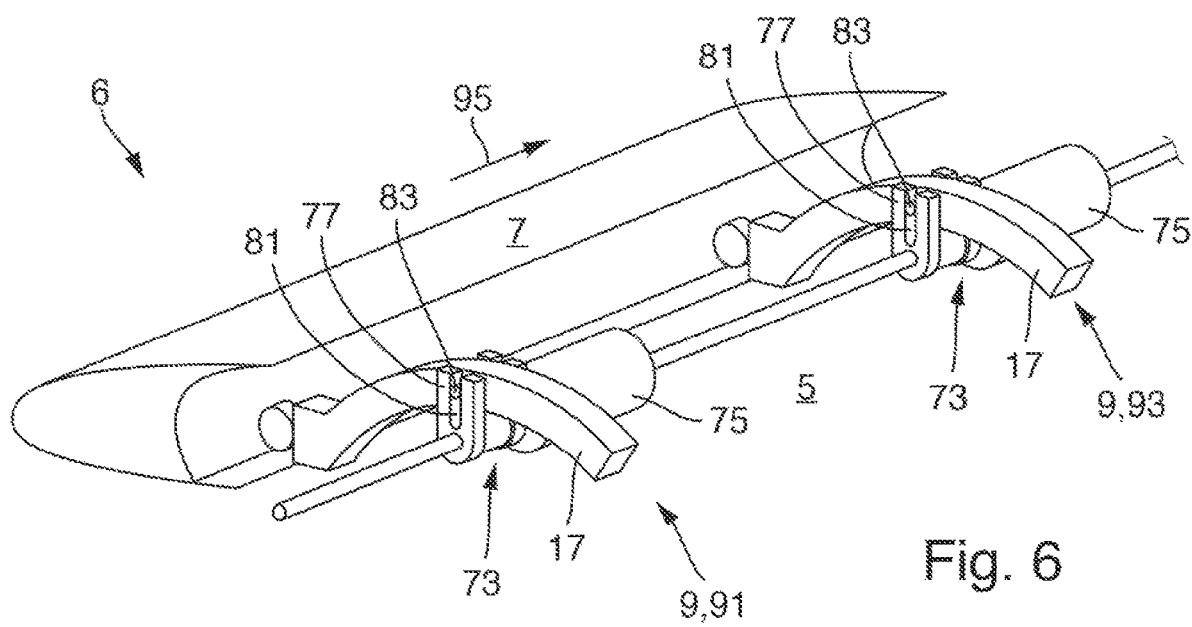
FIG. 6 shows a schematic perspective view of a slat assembly according to an embodiment of the present invention.

FIG. 6 shows a slat assembly 6 for an aircraft 1 as shown in FIG. 1. The slat assembly 6 comprises a connection assembly 9 as described before in connection with FIGS. 2-5. FIGS. 7 to 13 show different embodiments of connection assemblies 9 that might be used in connection with the slat assembly 6 of FIG. 6.

All embodiments shown in FIGS. 7 to 13 have in common that the connection assembly 9 comprises a drive unit 73 mounted to the main wing 5 and configured for driving the slat track 17 for movement along the track longitudinal axis 19 and along the predetermined path to move the slat 7 between the retracted and extended positions. In FIGS. 7 to 10, under a) the retracted position is illustrated while under b) the extended position is illustrated.

The drive unit 73 comprises a rotary actuator 75, preferably a geared rotary actuator (GRA), mounted to the main wing 5 and having at least one elongate drive arm 77 in the form of a crank arm rotatably driven about a rotation axis 79 that is fixed at the main wing 5 and drivingly engaging the slat track 17. The drive arm 77 comprises at least one groove 81 in the form a slot extending radially with respect to the rotation axis 79, and the slat track 17 comprises at least one spigot 83 formed as a pin drivingly engaging the groove 81 and extending in parallel to the rotation axis 79.

As shown in FIGS. 7 to 12, the spigot 83 is provided at a lateral side of the slat track 17 at the intermediate portion 25 of slat track 17. The groove 81 is formed in the drive arm 77 and the spigot 83 extends from the lateral surface of slat track 17. Further, the slat track 17 has a curved shape and, when moved along the track longitudinal axis 19 between retracted and extended positions of the slat 7, the slat track 17 is movable along a curved path having an axis of rotation 85, i.e., a center of rotation about which the slat track 17 is moved, spaced in parallel from the rotation axis 79 of the drive arm 77. Therefore, the spigot 83 engages the groove 81 with a predefined play in a radial direction with respect to the rotation axis 79.

Figure 7A:
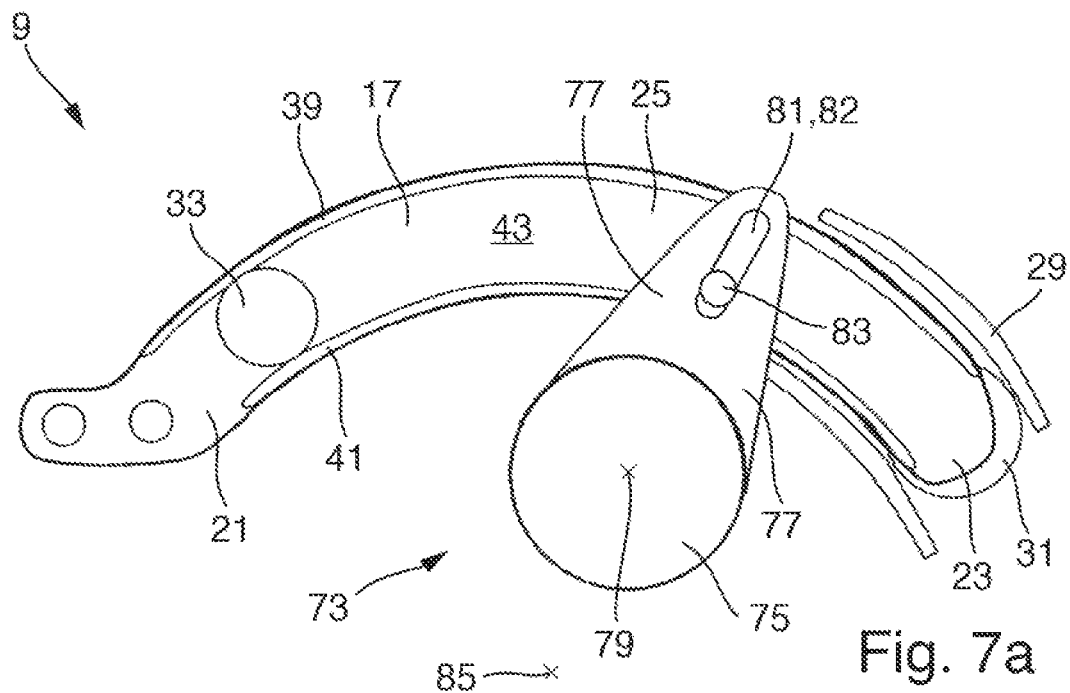
FIG. 7a shows a schematic side view of a connection assembly according to an embodiment of the invention in a retracted position.
Figure 7B:
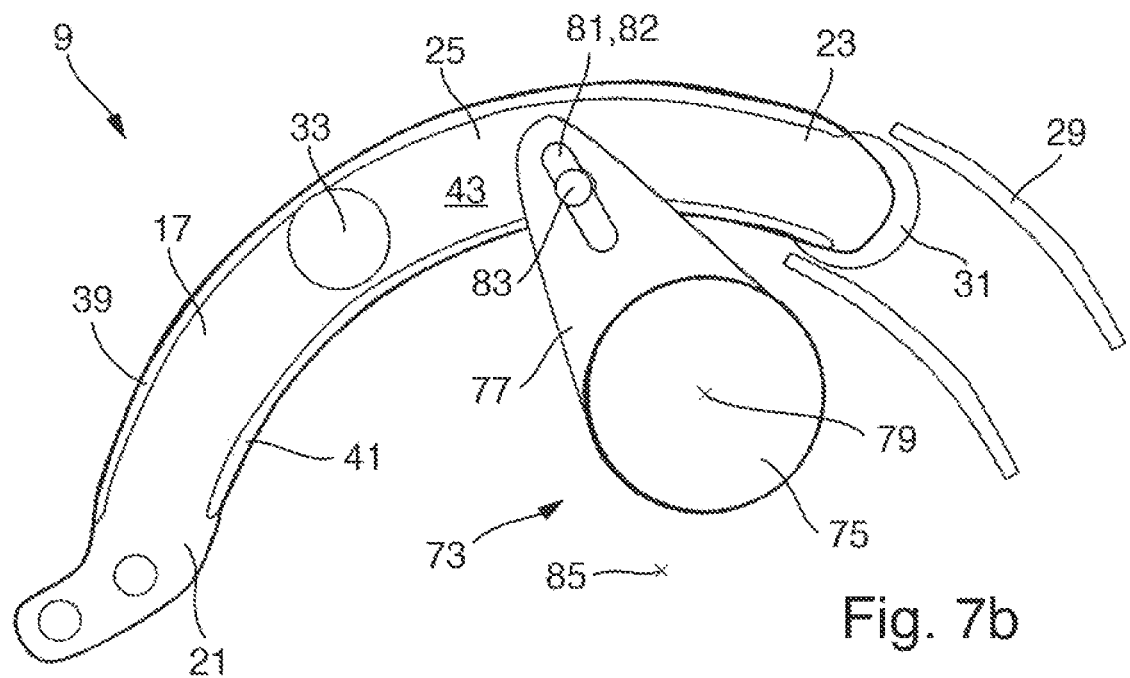
FIG. 7b shows a schematic side view of the connection assembly according to FIG. 7a in an extended position.

In the embodiment shown in FIG. 7, the groove 81 is formed as a long hole 82 extending in a radial direction with respect to the rotation axis 79, so that the spigot 83 can move radially within the long hole 82 when the drive arm 77 is rotated to move the slat track 17.

Figure 8A:
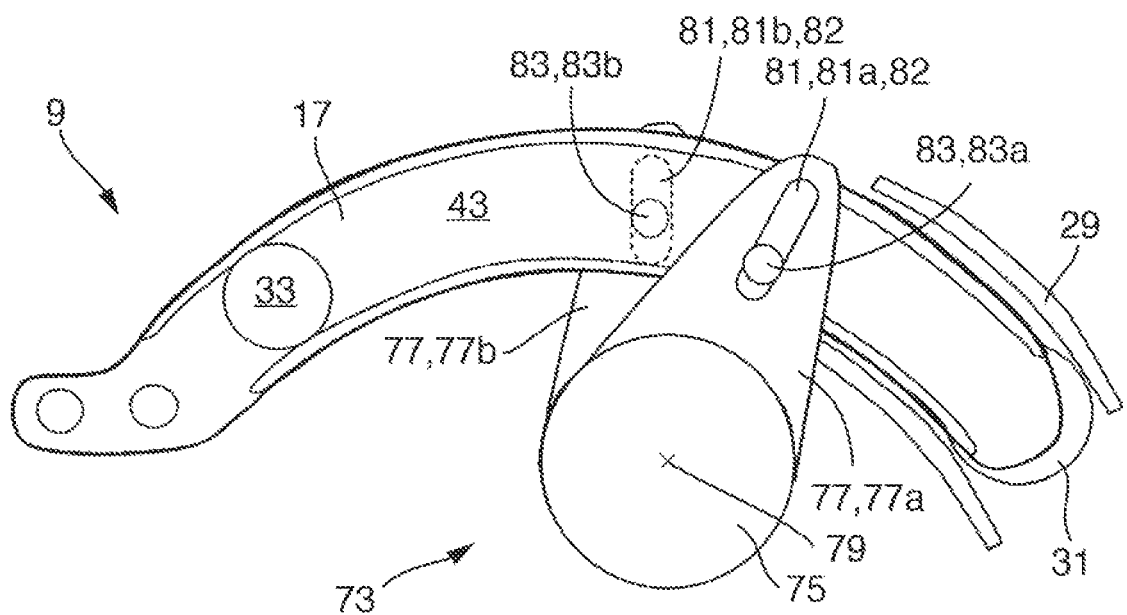
FIG. 8a shows a schematic side view of a connection assembly according to another embodiment of the invention in a retracted position.
Figure 8B:
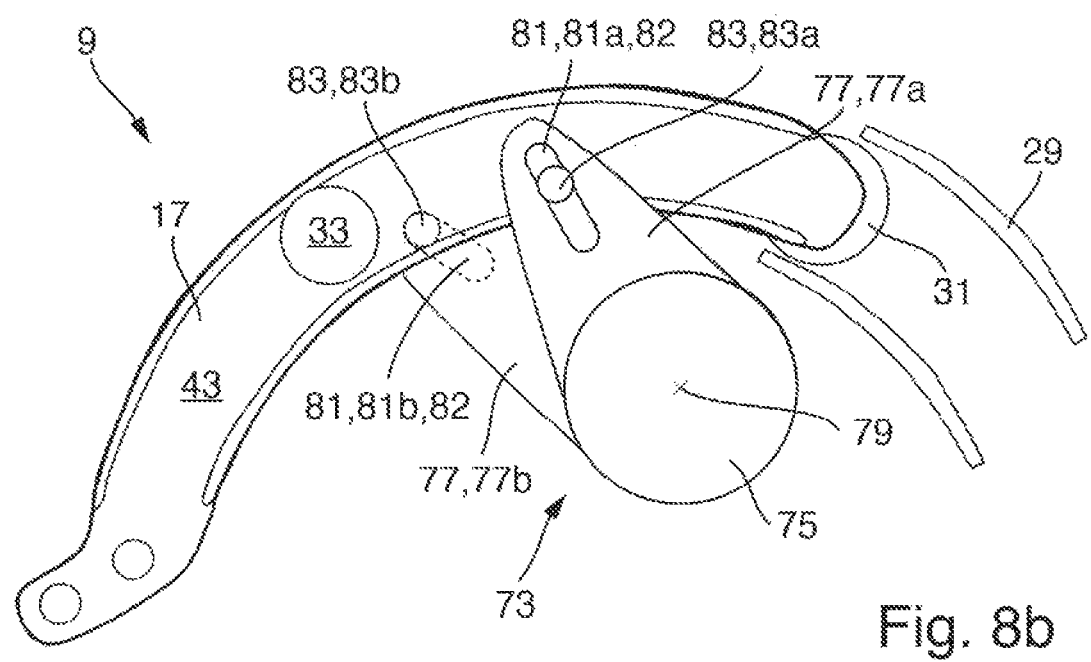
FIG. 8b shows a schematic side view of the connection assembly according to FIG. 8a in an extended position.
Figure 12:
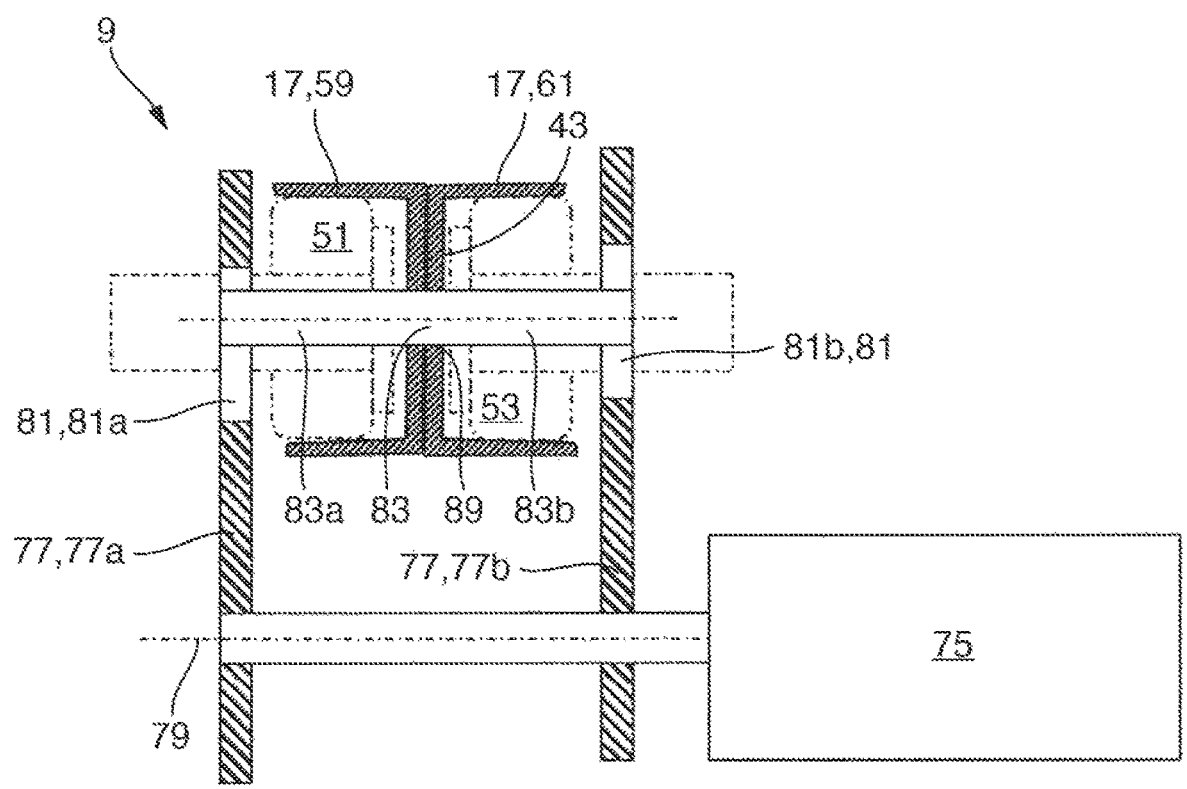
FIG. 12 shows a schematic cross-sectional view of a connection assembly according to another embodiment of the invention.

In the embodiments shown in FIGS. 8 and 12, the drive arm 77 is a first drive arm 77a and the rotary actuator 75 comprises a second drive arm 77b rotatably driven about the rotation axis 79 and drivingly engaging the slat track 17. The first drive arm 77a comprises a first groove 81a in the form of a long hole 82 extending in a radial direction with respect to the rotation axis 79. The slat track 17 comprises a first spigot 83a in the form of a pin drivingly engaging the first groove 81a and extending in parallel to the rotation axis 79. Likewise, the second drive arm 77b comprises a second groove 81b in the form of a long hole 82 extending in a radial direction with respect to the rotation axis 79. The slat track 17 comprises a second spigot 83b in the form of a pin drivingly engaging the second groove 81b and extending in parallel to the rotation axis 79.

While in FIG. 8 the first spigot 83a and the second spigot 83b are formed separately and are arranged parallelly spaced apart from one another, in FIG. 12 the first spigot 83a and the second spigot 83b are formed integrally and extend coaxially to one another.

Figure 9A:
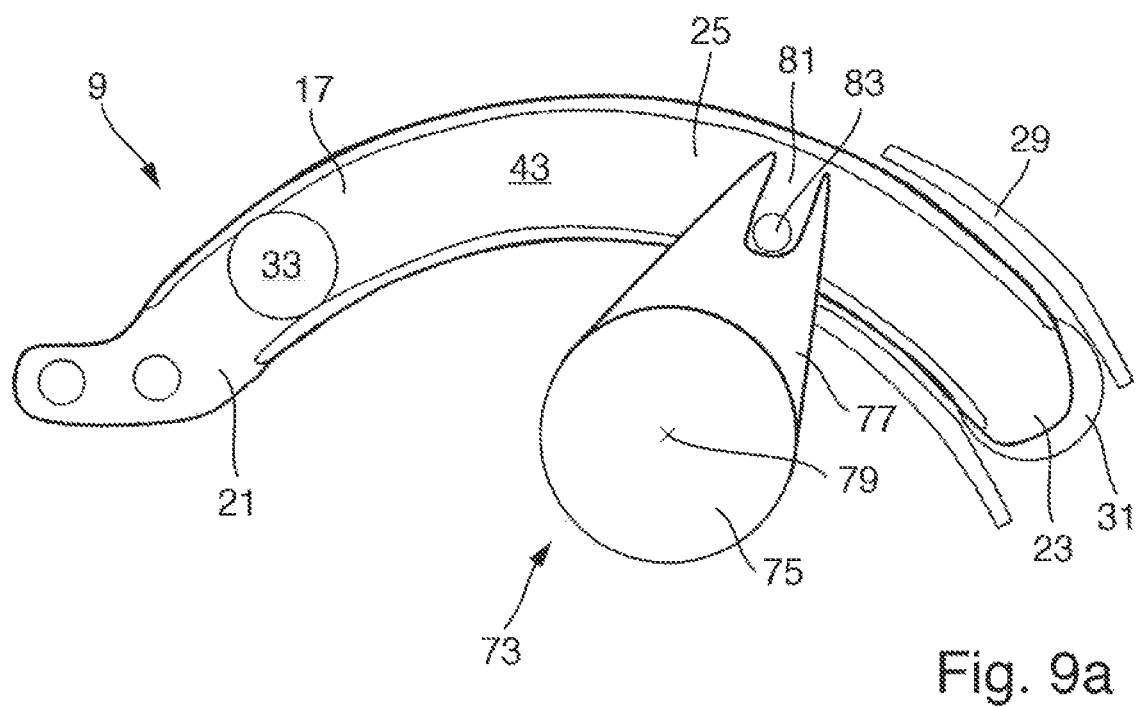
FIG. 9a shows a schematic side view of a connection assembly according to another embodiment of the invention in a retracted position.
Figure 9B:
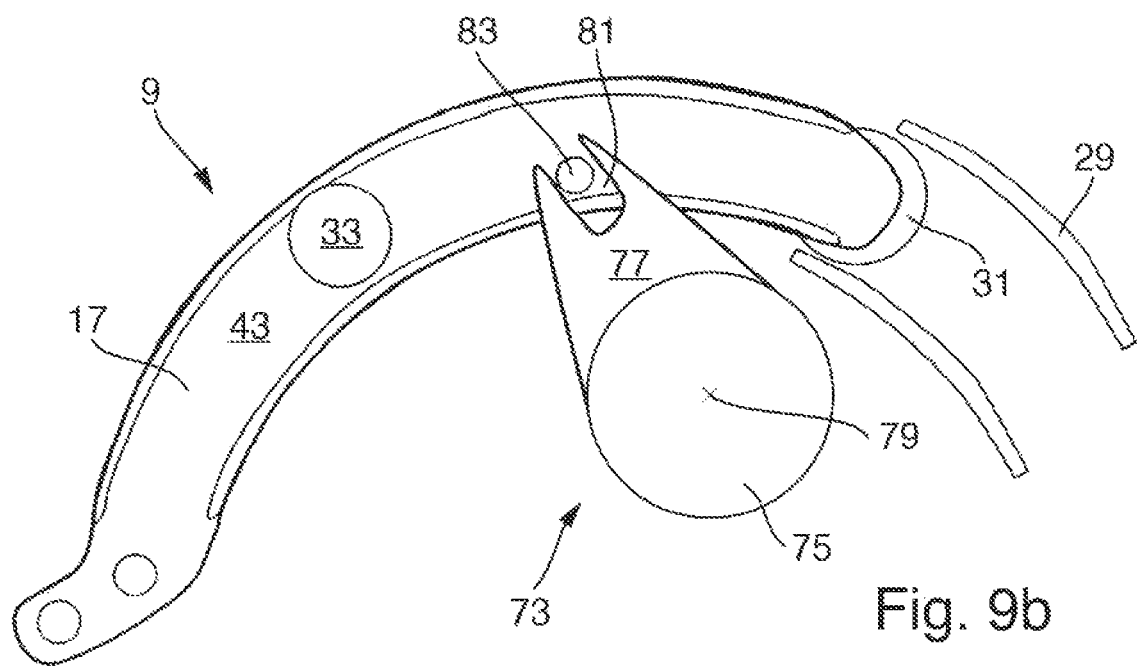
FIG. 9b shows a schematic side view of the connection assembly according to FIG. 9a in an extended position.
Figure 10A:
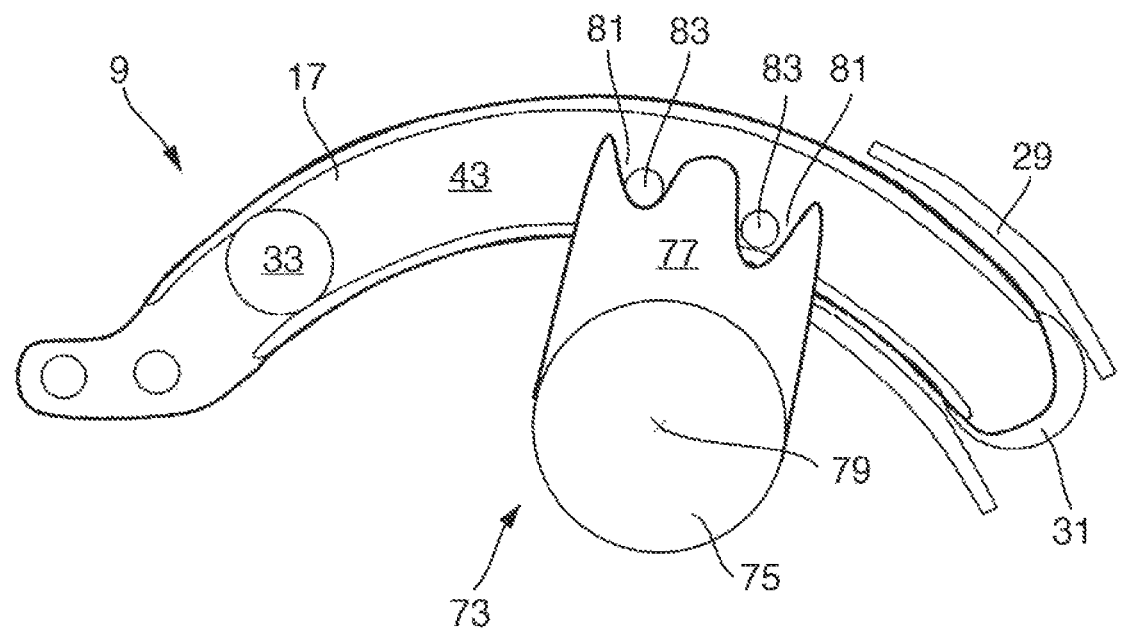
FIG. 10a shows a schematic side view of a connection assembly according to another embodiment of the invention in a retracted position.
Figure 10B:
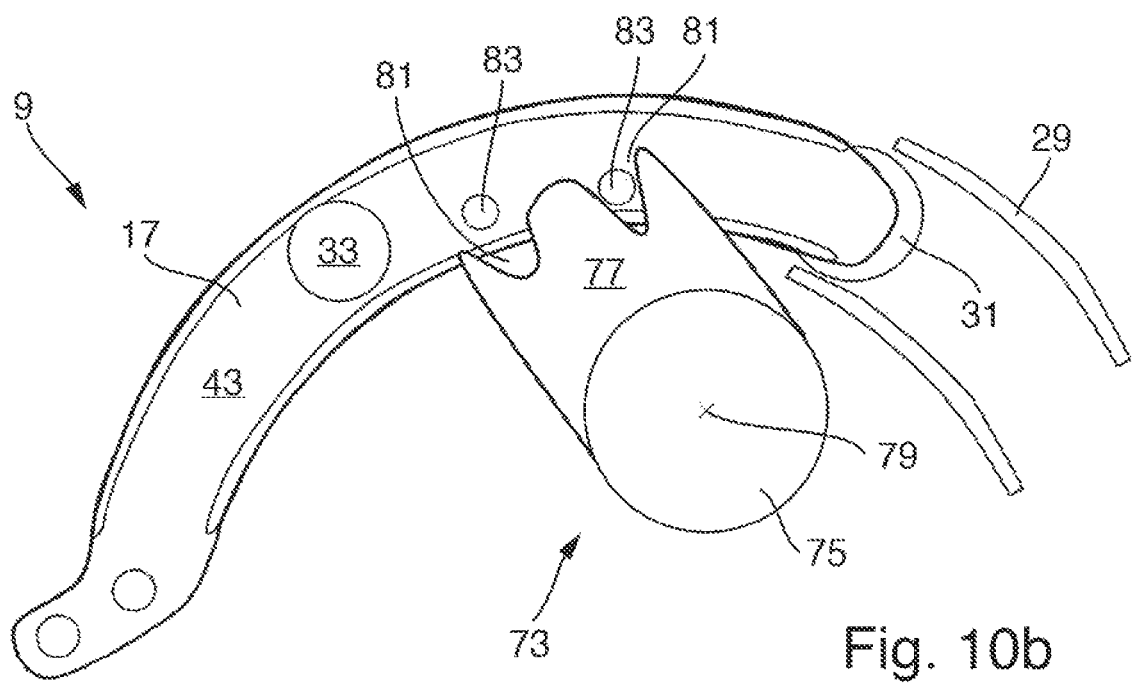
FIG. 10b shows a schematic side view of the connection assembly according to FIG. 10a in an extended position.
Figure 11:
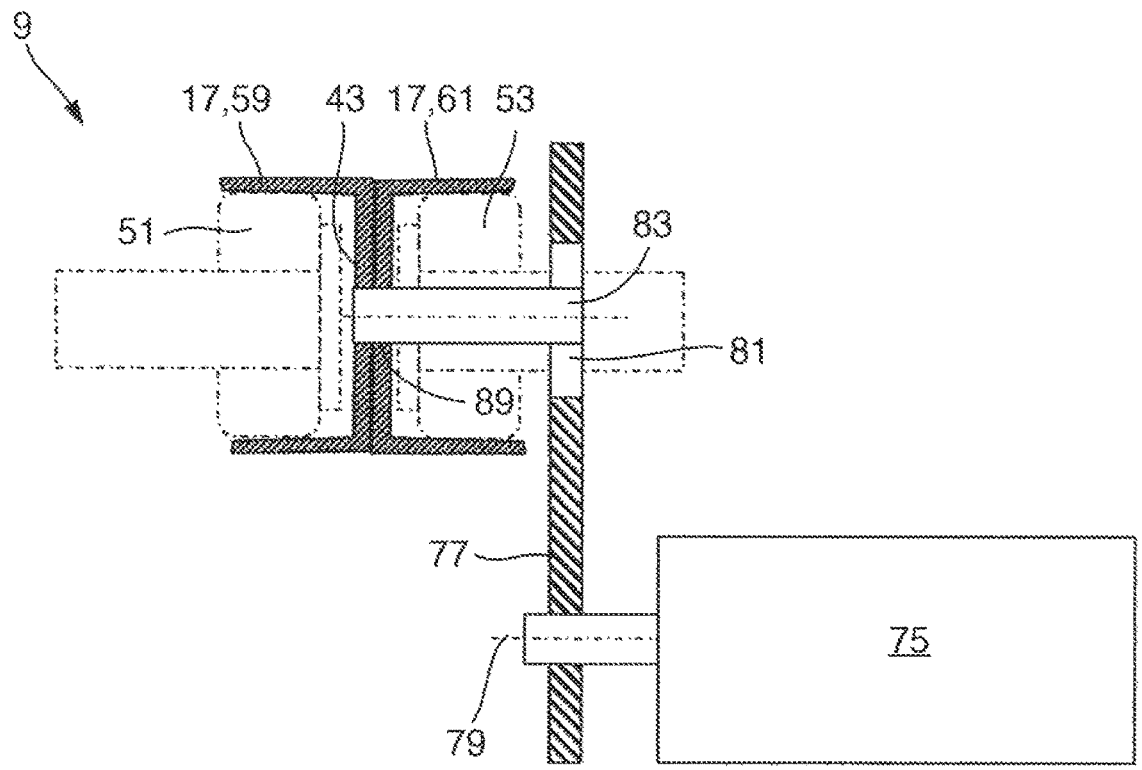
FIG. 11 shows a schematic cross-sectional view of a connection assembly according to another embodiment of the invention.

In the embodiments shown in FIGS. 9 and 10, the groove 81 is open at an outer end, i.e., a distal end, of the drive arm 77.

In the embodiment shown in FIG. 10, the drive arm 77 comprises two grooves 81, and the slat track 17 comprises two spigots 83 drivingly engaging the two grooves 81.

As shown in FIGS. 7 to 13, the spigot 83 is arranged in the web portion 43 of the slat track 17. Specifically, the spigot 83 is received in a corresponding bore 89 in the web portion 43 and projects away from the web portion 43 from one side (FIG. 11) or from both opposite sides (FIG. 12).

Figure 13:
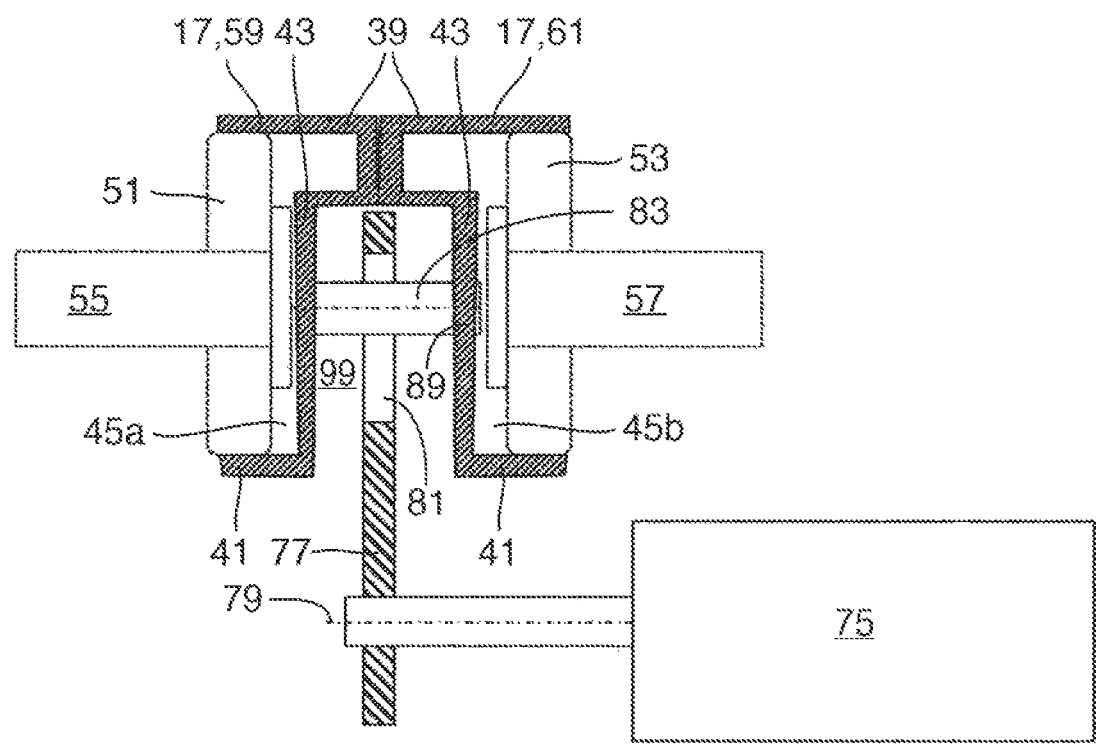
FIG. 13 shows a schematic cross-sectional view of a connection assembly according to another embodiment of the invention.

In the embodiment shown in FIG. 13, the cross-section across the track longitudinal axis 19 of the slat track 17 is formed such that a predefined gap 99 is formed between a lower portion of the first track part 59 and a lower portion of the second track part 61 in extension of the contact plane 65. The spigot 83 is arranged in the web portion 43 of the first and second track parts 59, 61 on opposite sides of the gap 99. The drive arm 77 extends inside the gap 99 to engage with the slat track 17, specifically to engage the spigot 83 arranged in the web portion 43 by the groove 81 arranged in the drive arm 77.

As shown in FIGS. 1 and 6, the connection assembly 9 is a first connection assembly 91, and the wing 3 comprises a second connection assembly 93 connecting the slat 7 to the main wing 5 in a position spaced apart from the first connection assembly 91 in a wing span direction 95, and wherein the second connection assembly 93 is formed as the first connection assembly 91.

By the invention as described before, a wing 3 is provided having a very simple, robust, and cost-efficient drive unit 73, since no high precision gear teeth are involved and assembly tolerances are rather low compared to a rack-and-pinion drive. Also, maintenance efforts can be essentially reduced. Further, different positions of the drive arm 77 are possible and a dual load path design with two drive arms 77 is enabled.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A wing for an aircraft, comprising:
a main wing, and
a slat assembly comprising:
a slat, and at least one connection assembly movably connecting the slat to the main wing, such that the slat is movable between a retracted position and at least one extended position, wherein the at least one connection assembly comprises an elongate slat track that extends along a track longitudinal axis between a front end and a rear end and has an intermediate portion between the front and rear ends, wherein the front end of the slat track is mounted to the slat, wherein the rear end of the slat track, or the intermediate portion of the slat track, or both are mounted to the main wing by a roller or slide bearing such that the slat track is movable along the track longitudinal axis, wherein the connection assembly comprises a drive unit configured for driving the slat track for movement along the track longitudinal axis, wherein the drive unit comprises a rotary actuator mounted to the main wing and having at least one drive arm rotatably driven about a rotation axis and drivingly engaging the slat track, and, wherein one of the at least one drive arm and the slat track comprises at least one groove and the other one of the drive aim and the slat track comprises at least one spigot drivingly engaging the at least one groove, wherein rotation of the at least one drive arm imparts movement to each of the at least one spigot and the at least one groove.

2. The wing according to claim 1, wherein the at least one spigot or the at least one groove is provided at a lateral side of the slat track at the intermediate portion of slat track.

3. The wing according to claim 1, wherein the at least one spigot engages the at least one groove with a predefined play.

4. The wing according to claim 3, wherein the at least one groove is formed as a slot extending in a radial direction with respect to the rotation axis.

5. The wing according to claim 1, wherein the at least one groove is open at an outer end of the at least one drive arm.

6. The wing according to claim 1, wherein the one of the at least one drive arm and the slat track comprising the at least one groove comprises two grooves, and wherein the other one of the at least one drive arm and the slat track comprising the at least one spigot comprises two spigots drivingly engaging the two grooves.

7. The wing according to claim 1, wherein the at least one drive arm is a first drive arm and wherein the rotary actuator comprises a second drive aim rotatably driven about the rotation axis and drivingly engaging the slat track.

8. The wing according to claim 7, wherein one of the first drive arm and the slat track comprises a first groove, and the other one of the first drive arm and the slat track comprises a first spigot drivingly engaging the first groove, or
wherein one of the second drive arm and the slat track comprises a second groove and the other one of the second drive aim and the slat track comprises a second spigot drivingly engaging the second groove, or
wherein one of the first drive arm and the slat track comprises a first groove, and the other one of the first drive aim and the slat track comprises a first spigot drivingly engaging the first groove and one of the second drive aim and the slat track comprises a second groove and the other one of the second drive arm and the slat track comprises a second spigot drivingly engaging the second groove.

9. The wing according to claim 8, wherein the first spigot and the second spigot are formed integrally, or extend coaxially, or are formed integrally and extend coaxial.

10. The wing according to claim 8, wherein the first spigot is spaced apart from the second spigot.

11. The wing according to claim 1, wherein the roller or slide bearing comprises a guide rail mounted to the main wing and a first roller unit mounted to the rear end of the slat track and engaging the guide rail, and
wherein the roller or slide bearing comprises a second roller unit that is mounted to the main wing and that engages an engagement surface provided at the intermediate portion of the slat track.

12. The wing according to claim 11, wherein the slat track has a profile comprising an upper flange portion, a lower flange portion and at least one web portion connecting upper and lower flange portions, and
the second roller unit is arranged in a recess between the upper and lower flange portions and engages the engagement surface provided at the upper flange portion, or at the lower flange portion, or at both the upper and lower flange portions.

13. The wing according to claim 12, wherein the slat track has such a profile that a first recess is formed between the upper and lower flange portions at a first side of the web portion, and a second recess is formed between the upper and lower flange portions at a second side of the web portion opposite the first side.

14. The wing according to claim 13, wherein the second roller unit comprises a first roller element and a second roller element,
wherein the first roller element is arranged in the first recess and the second roller element is arranged in the second recess, and
wherein first and second roller elements are arranged coaxially and have the same radius.

15. The wing according to claim 12, wherein the at least one groove or the at least one spigot is arranged in the web portion.

16. The wing according to claim 1, wherein the slat track comprises a first track part and a second track part that are formed separate from one another,
wherein each of the first and second track parts is formed integrally and extends along the track longitudinal axis from the rear end to the front end, and
wherein the first and second track parts are mounted to one another and rest against one another along a contact plane spanned by the track longitudinal axis and a wing thickness direction.

17. The wing according to claim 16, wherein the cross-section of the slat track is formed such that a predefined gap is formed between a portion of the first track part and a portion of the second track part in extension of the contact plane,
wherein the at least one spigot or the at least one groove is arranged in the web portion of the first and second track parts on opposite sides of the gap, and
wherein the at least one drive arm extends inside the gap to engage with the slat track.

18. The wing according to claim 1, wherein the connection assembly is a first connection assembly,
wherein the wing comprises a second connection assembly connecting the slat to the main wing in a position spaced apart from the first connection assembly in a wing span direction, and
wherein the second connection assembly is formed the same as the first connection assembly.

19. A wing for an aircraft, comprising:
a main wing, and
a slat assembly comprising:
- a slat, and
- at least one connection assembly movably connecting the slat to the main wing, such that the slat is movable between a retracted position and at least one extended position, wherein the at least one connection assembly comprises an elongate slat track that extends along a track longitudinal axis between a front end and a rear end and has an intermediate portion between the front and rear ends, wherein the front end of the slat track is mounted to the slat, wherein the rear end of the slat track, or the intermediate portion of the slat track, or both are mounted to the main wing by a roller or slide bearing such that the slat track is movable along the track longitudinal axis, wherein the connection assembly comprises a drive unit configured for driving the slat track for movement along the track longitudinal axis, wherein the drive unit comprises a rotary actuator mounted to the main wing and having at least one drive arm rotatably driven about a rotation axis and drivingly engaging the slat track, and, wherein one of the at least one drive arm and the slat track comprises at least one groove and the other one of the drive aim and the slat track comprises at least one spigot drivingly engaging the at least one groove, wherein the slat track is movable along a straight path or is movable along a curved path having an axis of rotation spaced from the rotation axis of the at least one drive arm.

20. A slat assembly for a wing of an aircraft, the slat assembly comprising
- a slat, and
- at least one connection assembly for movably connecting the slat to a main wing of the aircraft, the at least one connection assembly comprising:
  - an elongate slat track that extends along a track longitudinal axis between a front end and a rear end and has an intermediate portion between the front and rear ends, wherein the front end of the slat track is configured to be mounted to the slat, wherein the rear end of the slat track, or the intermediate portion of the slat track, or both are configured to be mounted to the main wing by a roller or slide bearing such that the slat track is movable along the track longitudinal axis, wherein the at least one connection assembly comprises a drive unit configured for driving the slat track for movement along the track longitudinal axis, wherein the drive unit comprises a rotary actuator mounted to the main wing and having at least one drive arm rotatably driven about a rotation axis and drivingly engaging the slat track, wherein one of the at least one drive arm and the slat track comprises at least one groove and the other one of the at least one drive aim and the slat track comprises at least one spigot drivingly engaging the at least one groove, and wherein rotation of the at least one drive arm imparts movement to each of the at least one spigot and the at least one groove.

* * * * *